US008249001B2

(12) United States Patent
Oota et al.

(10) Patent No.: US 8,249,001 B2
(45) Date of Patent: Aug. 21, 2012

(54) BASE STATION APPARATUS, MOBILE STATION APPARATUS, AND METHOD OF ASSIGNING SUBCARRIERS (75) Inventors: Yoshiyuki Oota, Kawasaki (JP); Takanori Iwamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 975 days.

(21) Appl. No.: 12/232,170

(22) Filed: Sep. 11, 2008

(65) Prior Publication Data
US 2009/0016291 A1 Jan. 15, 2009

Related U.S. Application Data (63) Continuation of application No. PCT/JP2006/305450, filed on Mar. 17, 2006.

(51) Int. Cl.
*H04W 4/00* (2009.01)
*H04B 15/00* (2006.01)
*H04B 7/00* (2006.01)
*H04B 1/18* (2006.01)

(52) U.S. Cl. ............ 370/329; 370/341; 455/45; 455/62; 455/179.1

(58) Field of Classification Search .................. None
See application file for complete search history.

(56) References Cited

U.S. PATENT DOCUMENTS

| 5,910,947 | A | * | 6/1999 | Futamura | 370/332 |
| 6,947,748 | B2 | | 9/2005 | Li et al. | |
| 7,257,410 | B2 | | 8/2007 | Chun et al. | |
| 2005/0048979 | A1 | | 3/2005 | Chun et al. | |
| 2006/0198455 | A1 | * | 9/2006 | Fujii et al. | 375/260 |
| 2007/0140102 | A1 | * | 6/2007 | Oh et al. | 370/208 |
| 2010/0211540 | A9 | * | 8/2010 | Das et al. | 707/603 |

FOREIGN PATENT DOCUMENTS

| JP | 11-113049 | 4/1999 |
| JP | 2002-335557 | 11/2002 |
| JP | 2004-523934 | 8/2004 |
| JP | 2004-529524 | 9/2004 |
| JP | 2005-502218 | 1/2005 |
| JP | 2005-80286 | 3/2005 |
| JP | 2005-142935 | 6/2005 |
| JP | 2006-033480 | 2/2006 |
| WO | 02/31991 A2 | 4/2002 |
| WO | 02/31991 A3 | 4/2002 |
| WO | WO 2005/089000 * | 9/2005 |

OTHER PUBLICATIONS

International Preliminary Report on Patentability dated Oct. 30, 2008 received in PCT/JP2006/305450.

* cited by examiner

*Primary Examiner* — Ayaz Sheikh
*Assistant Examiner* — Sori Aga
(74) *Attorney, Agent, or Firm* — Murphy & King, P.C.

(57) ABSTRACT

A base station assigns a subcarrier for downlink communications under Orthogonal Frequency Division Multiple Access. Before downlink communications with a mobile station, based on carrier sensing by the mobile station, the base station detects information concerning an available subcarrier from downlink signals using a modulating unit. The information concerning the available subcarrier is stored in a downlink-information sharing unit and is shared among the base station and the adjacent base stations. A downlink subcarrier setting unit sets the available subcarrier for downlink communications.

11 Claims, 13 Drawing Sheets

BASE STATION APPARATUS, MOBILE STATION APPARATUS, AND METHOD OF ASSIGNING SUBCARRIERS

BACKGROUND

1. Field

The present invention pertains to subcarrier assignment for uplink/downlink communications using Orthogonal Frequency Division Multiple Access (OFDMA).

2. Description of the Related Art

Conventionally, in a subcarrier assignment scheme of OFDMA communication, contiguous base stations use different frequencies to avoid interference. Published Japanese Translation of PCT International Publication No. 2005-502218 and Published Japanese Translation of PCT International Publication No. 2004-529524 disclose a technique of subcarrier assignment for a base station where a subscriber (mobile station) detects interference and a subcarrier channel, and provides a base station with information that is used for subcarrier assignment at the base station. Japanese Patent Application Laid-Open Publication No. 2005-80286 discloses a technique in which, when an assignment of forward-direction channels is performed, transmission of control information and data that are exchanged between a mobile station and a base station is controlled respectively based on a cell pattern.

Figure 8:
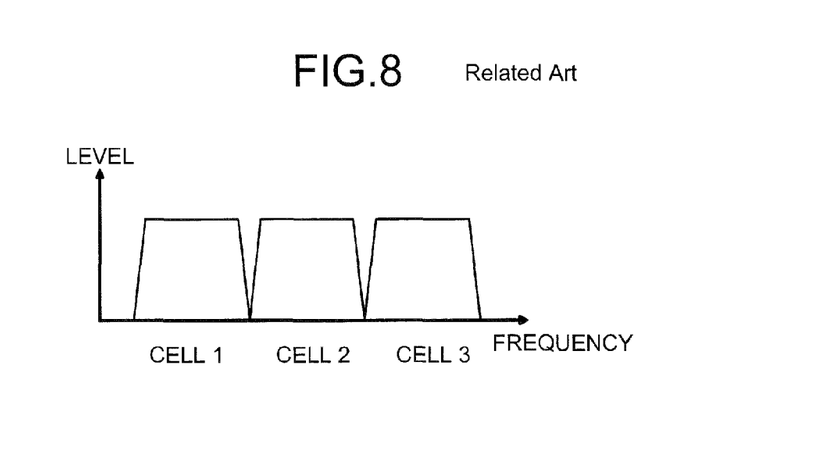
FIG. 8 is a diagram depicting subcarrier assignment according to the conventional art.

FIG. 8 is a diagram depicting subcarrier assignment according to the conventional art. As shown in FIG. 8, if the system consists of three cells, frequency bands are allocated to each cell (cell 1, 2, 3), respectively, in advance and subcarriers are assigned to users within the range of an allocated frequency band.

Figure 9A:
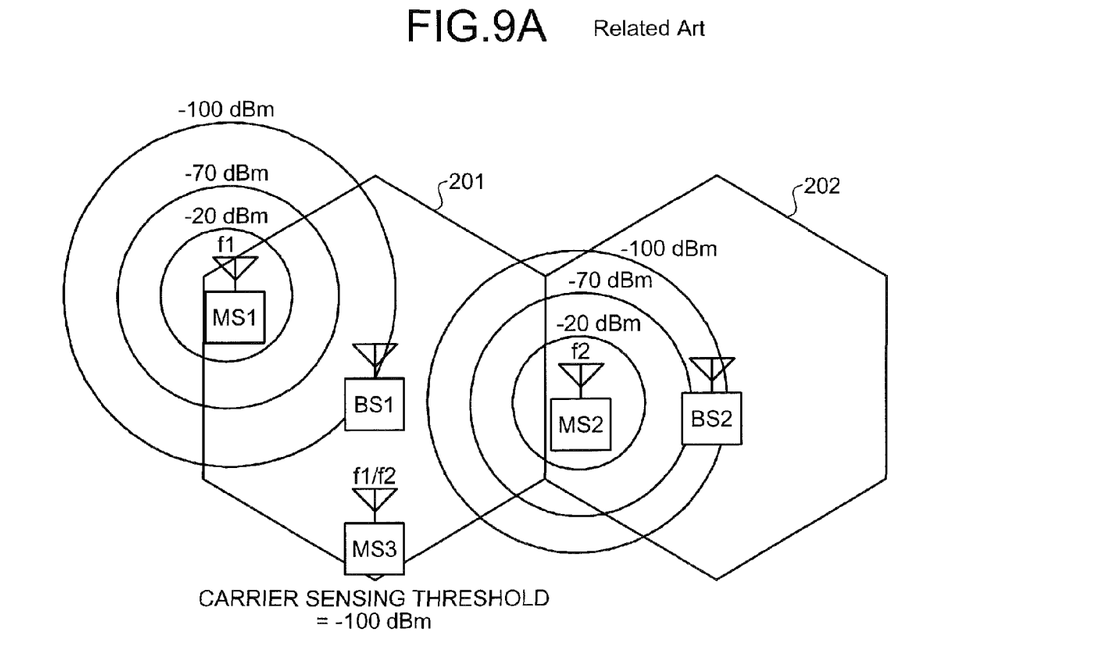
FIG. 9A is a diagram explaining a conventional carrier sensing scheme.

FIG. 9A is a diagram of a conventional carrier sensing scheme. In this example, the figure depicts two base stations (BS) BS1 and BS2, and three mobile stations (MS) MS1, MS2, and MS3, which execute carrier sensing for an uplink path.

MS1 and MS3 are in a cell 201 of BS1, and MS2 is in a cell 202 of BS2. MS1 uses frequency f1, and MS2 uses frequency f2. Circles in the figure indicate distribution of electric field intensity of signals. It is assumed here that a threshold for carrier sensing of MS3 is −100 dBm. MS3 is at a point where the intensity of signals from MS1 and MS2 is less than the threshold for carrier sensing of MS3. In this case, MS3 cannot sense signals of frequency f1 from MS1 or signals of frequency f2 from MS2, thereby concluding that both frequencies f1 and f2 can be used.

However, with the configuration shown in FIG. 8, even if traffic concentrates in certain cells, subcarriers that have been assigned to other cells cannot be transferred. As shown in FIG. 8, each base station uses a frequency band different from the other base stations in order to avoid interference. Consequently, one cell cannot change (increase) a ratio of the frequency band of the cell to a certain range of frequency. In the case of the configuration shown in FIG. 8, the reuse factor equals 3, and it has been difficult to make the reuse factor equal 1. If the reuse factor is reduced toward 1, frequencies can be assigned to cells flexibly and dynamically.

Figure 9B:
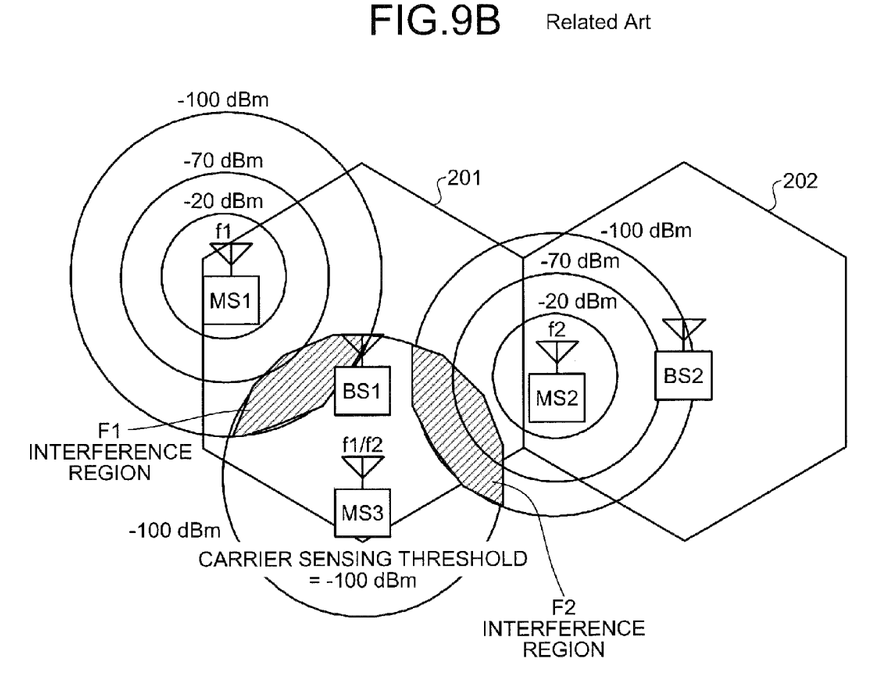
FIG. 9B is a diagram depicting interference after the carrier sensing shown in FIG. 9A.

FIG. 9B is a diagram depicting interference after the carrier sensing shown in FIG. 9A. When MS3 tries to establish uplink communications (UL), MS3 executes carrier sensing, determines that frequencies f1 and f2 are both available, and uses frequency f1 or f2. If MS3 uses frequency f1, interference with frequency f1 of MS1 occurs at a region F1. If MS3 uses frequency f2, interference with frequency f2 of MS2 occurs at a region F2. Further, if MS3 moves around and the direction of the antenna of MS3 changes so that the regions F1 and F2 are located at BS1, BS1 is affected when receiving signals from mobile stations (for example, an error rate deteriorates), and the communication quality will deteriorate.

SUMMARY

It is an object of the present invention to at least solve the above problems in the conventional technologies.

A base station apparatus according to one aspect of the present invention assigns a subcarrier in downlink communication under Orthogonal Frequency Division Multiple Access. The base station apparatus includes an obtaining unit that obtains, before downlink communication with a mobile station apparatus, information resulting from carrier sensing by the mobile station apparatus and concerning an available subcarrier; an information sharing unit that informs an adjacent base station apparatus of the information concerning the available subcarrier, the information concerning the available subcarrier being shared between the base station apparatus and the adjacent base station apparatus; and a subcarrier setting unit that sets the available subcarrier for the downlink communication before the downlink communication with the mobile station apparatus.

A base station apparatus according to another aspect of the present invention assigns a subcarrier in uplink communication under Orthogonal Frequency Division Multiple Access. The base station apparatus includes a detecting unit that performs carrier sensing before uplink communication with a mobile station apparatus and detects an available subcarrier; an information sharing unit that informs an adjacent base station apparatus of information concerning the available subcarrier, the information concerning the available subcarrier being shared between the base station apparatus and the adjacent base station apparatus; and a subcarrier setting unit that sets the available subcarrier for the uplink communication before the uplink communication with the mobile station apparatus.

A mobile station apparatus according to still another aspect of the present invention communicates with a base station apparatus that assigns a subcarrier in uplink communication under Orthogonal Frequency Division Multiple Access. The mobile station apparatus includes a detecting unit that performs carrier sensing before downlink communication with the base station apparatus and detects an available subcarrier; and an informing unit that inserts information concerning the available subcarrier into an uplink signal to the base station apparatus to inform the base station apparatus of the information.

A method of assigning a subcarrier under Orthogonal Frequency Division Multiple Access according to yet another aspect of the present invention includes detecting an available subcarrier through carrier sensing by a signal-receiving apparatus that is a base station apparatus or a mobile station apparatus, before communication between the base station apparatus and the mobile station apparatus; sharing information concerning the available subcarrier among the base station apparatus and an adjacent base station apparatus; and assigning the subcarrier to communication between the base station apparatus and the mobile station apparatus before the communication begins.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Referring to the accompanying drawings, exemplary embodiments according to the present invention are explained in detail below.

The present invention pertains to assignment of a subcarrier(s) used for uplink (UL)/downlink (DL) communications at a base station. Hereinafter, downlink (DL) means data transmission from a base station to a mobile station, and uplink (UL) means data transmission from a mobile station to a base station.

In the case of UL communications, carrier sensing is performed at a base station, and subcarriers whose intensity is less than a threshold are detected. The base station informs other base stations in, for example, adjacent cells, of information concerning the result of the carrier sensing. The base stations share the information and set a frequency band as an uplink subcarrier for each mobile station such that interference does not occur. Each mobile station uses the uplink subcarrier according to the setting.

In the case of DL communications, carrier sensing is performed at a mobile station, and subcarriers whose intensity is less than a threshold are detected. The mobile station periodically transmits information concerning the result of the carrier sensing to a base station in a feedback scheme. The base station shares the information with other base stations in, for example, adjacent cells, and sets a frequency band as a downlink subcarrier to each mobile station to prevent interference. In the configuration above, mobile stations may determine that subcarriers whose intensity is less than the threshold are available, and inform base stations of information concerning the available subcarriers.

As described above, in both the UL and DL case, 1) carrier sensing is executed, 2) a receiving side of data transmission executes the carrier sensing, 3) contiguous base stations share the results of the carrier sensing, and 4) based on the results of the carrier sensing, a base station dynamically changes and sets a frequency band for downlink/uplink subcarriers. In this way, the reuse factor approaches 1.

Figure 1:
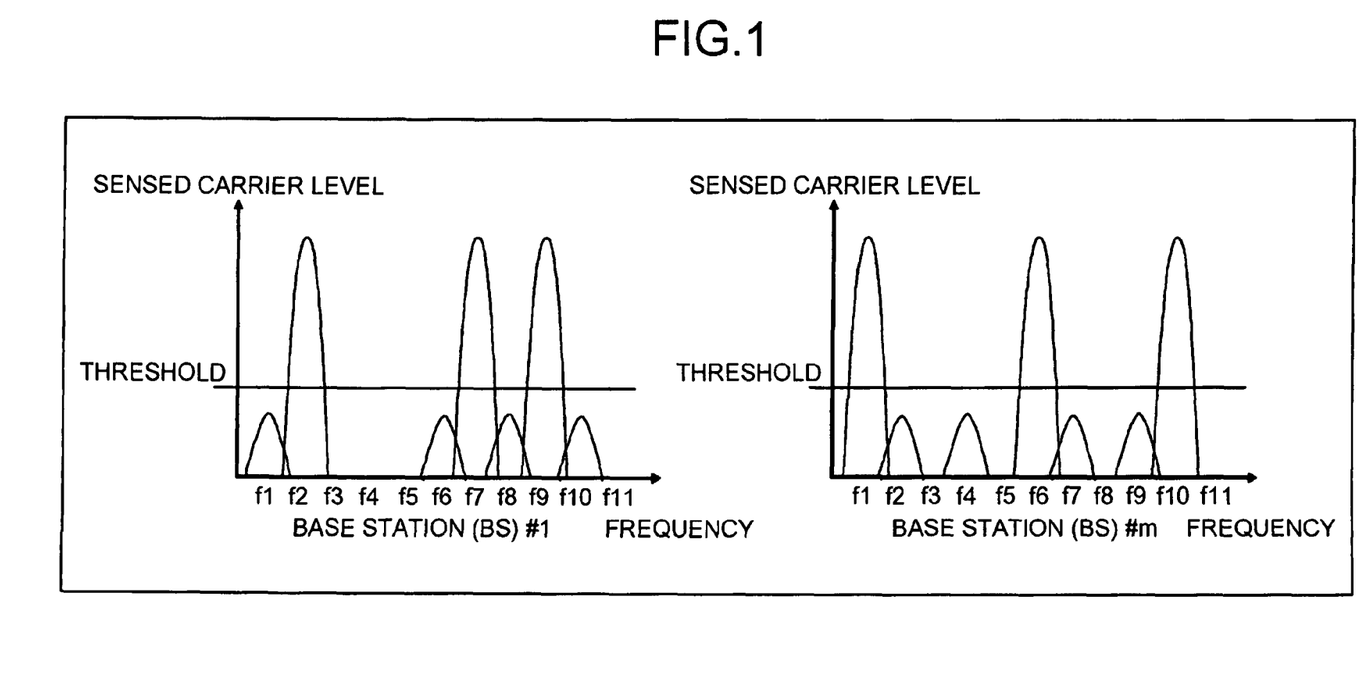
FIG. 1 is a diagram outlining a method for assigning subcarriers.

FIG. 1 is a diagram outlining a method for assigning subcarriers. FIG. 1 depicts uplink subcarriers (frequencies) which base station #1 and adjacent base station #m obtain by performing carrier sensing. For base station #1, frequencies f1, f3, f4, f5, f6, f8, f10, and f11 are below a threshold. For base station #m, frequencies f2, f3, f4, f5, f7, f8, f9, and f11 are below a threshold.

These adjacent base stations #1 and #m exchange information concerning the results of carrier sensing and share the information. It is assumed here that base station #n (not shown) exists adjacent to base stations #1 and #m. Base stations #1 and #m also share the information with base station #n.

Base station #n selects and assigns a subcarrier from among the subcarriers (available subcarriers) that were below the thresholds at base stations #1 and #m. In the case of FIG. 1, frequencies f3, f4, f5, f8, and f11 are subcarriers for both base stations #1 and #m. Base station #n assigns, for UL communications, subcarriers from among the available subcarriers f3, f4, f5, f8, and f11 based on an uplink bandwidth request, the number of users, quality of service (QoS) indicating priorities appertaining to data types, or propagation environment, etc., or any combination thereof. For DL communications, each mobile station performs carrier sensing and transmits information obtained through the carrier sensing. Base stations #1, #m, and #n share the information (the available subcarriers f3, f4, f5, f8, and f11) sent from all mobile stations, and assign subcarriers whose intensity is less than a threshold, based on the volume of downlink data, the number of users, QoS, or propagation environment, etc., or any combination thereof.

A process of downlink/uplink subcarrier assignment is explained in detail. For DL communications, a base station receives a result of carrier sensing from a base station, and the information (the result of carrier sensing) is shared among specified base stations. Available subcarriers are sought based on the information, and downlink subcarriers for mobile stations are set based on the volume of downlink data, the number of users, QoS, or propagation environment, etc., or any combination thereof.

Figure 2A:
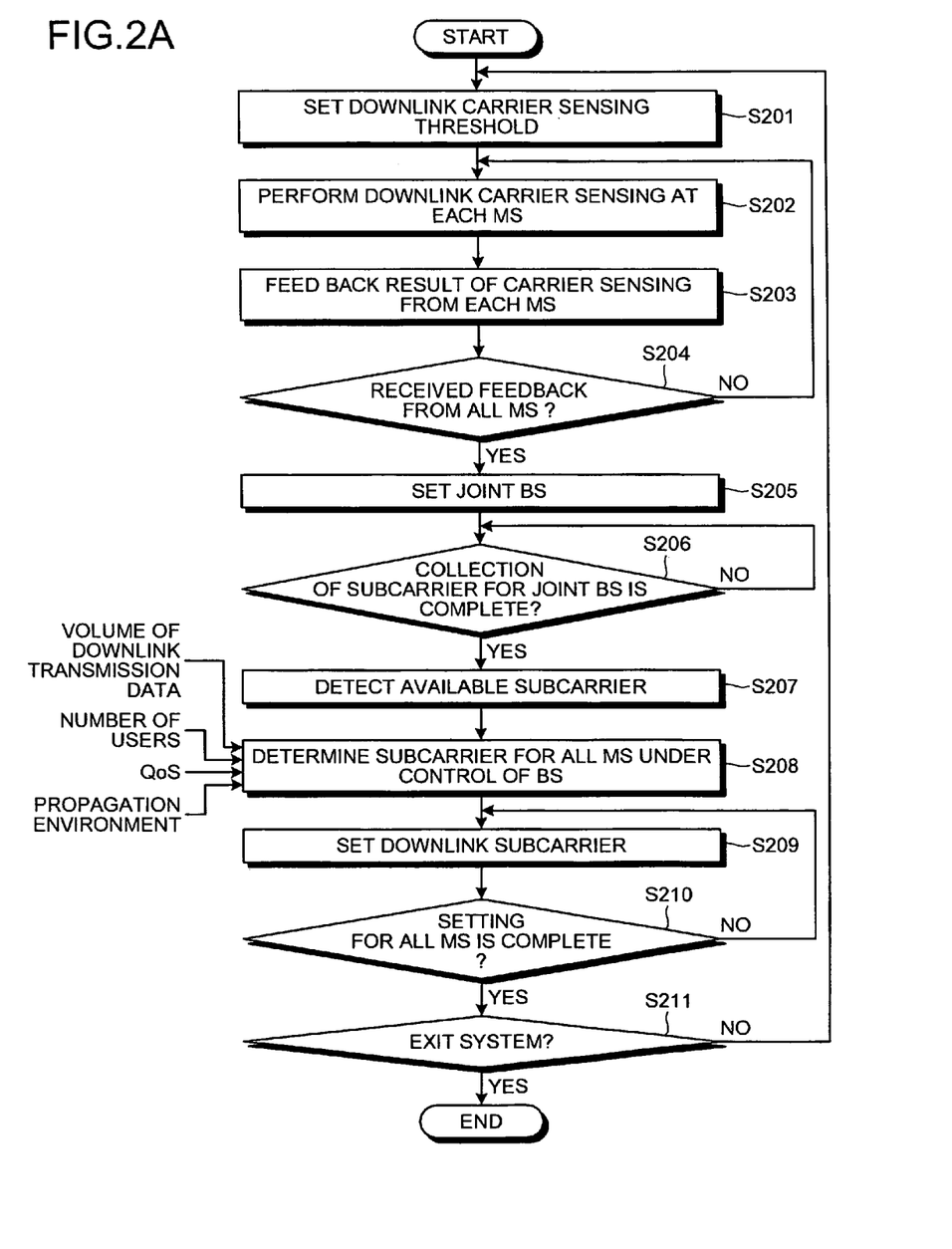
FIG. 2A is a flowchart of a process of downlink subcarrier assignment.

FIG. 2A is a flowchart of a process of downlink subcarrier assignment. For DL communications, a base station sets a downlink carrier sensing threshold for mobile stations (step S201). This setting is performed with a notification of the setting from the base station to a mobile station. Each mobile station performs downlink carrier sensing (step S202), and the base station receives a result of the carrier sensing from each mobile station as feedback (step S203). The base station determines whether the base station has received information (a result of carrier sensing) fed back from all mobile stations (step S204). If results have not been received from all mobile stations (step S204: NO), the flow returns to step S202. If the information fed back (the result of carrier sensing) has been received from all the mobile stations (step S204: YES), the flow proceeds to the following step.

The base station makes arrangements in advance for a setting concerning information sharing among base stations adjacent to the base station (a setting for joint base stations) (step S205). Base stations set at step S205 share information (result of carrier sensing fed back from mobile stations). It is determined whether subcarriers (frequencies) to be used at each base station set at step S205 have been collected (step S206). Since subcarriers are different at each base station, the collection of the information concerning subcarriers (frequencies) continues until the information is collected from all base stations (step S206: NO).

When the collection of information concerning the subcarriers (frequencies) used at each base station is complete (step S206: YES), the base station detects available subcarriers based on the results of carrier sensing shared among other base stations (step S207). The base station receives inputs of downlink transmission data volume, the number of users (mobile stations), QoS, propagation environment and so on, and determines a subcarrier (frequency) for each mobile station under the control of the base station, based on one or any combination of the inputs (step S208). The setting of a downlink subcarrier is performed based on the determination at step S208 (step S209). The process at step S209 is the setting of frequencies for OFDMA. For example, a frequency band for downlink subcarriers used at the base station is changed based on the number of users, input obtained at step S208, and if the number of users increases, the frequency band for downlink subcarriers expands. In other words, the frequency range for one cell in FIG. 8 expands so that the reuse factor approaches 1. Further, more subcarriers for data transmission mean more data can be transmitted.

It is checked whether assignment of downlink subcarriers (frequencies) for all mobile stations is complete (step S210). If not complete (step S210: NO), the flow returns to step S209 and downlink subcarriers are assigned to remaining mobile stations. When downlink subcarriers (frequencies) are assigned to all mobile stations (step S210: YES), it is determined whether to terminate the process of downlink subcarrier assignment (exit the system) (step S211). If the process is to be continued (step S211: NO), the process from step S201 is repeated. If the process is to be terminated (step S211: YES), the above process is terminated.

For uplink communications, designated base stations share information concerning the result of carrier sensing performed at a base station, and available subcarriers are sought in the information. Subcarriers for each mobile station is set based on an uplink bandwidth request, the number of users, QoS, or propagation environment, etc., or any combination thereof and the setting information being included in the DL communications is given to each mobile station. The mobile stations transmit data with an uplink subcarrier according to the setting information.

Figure 2B:
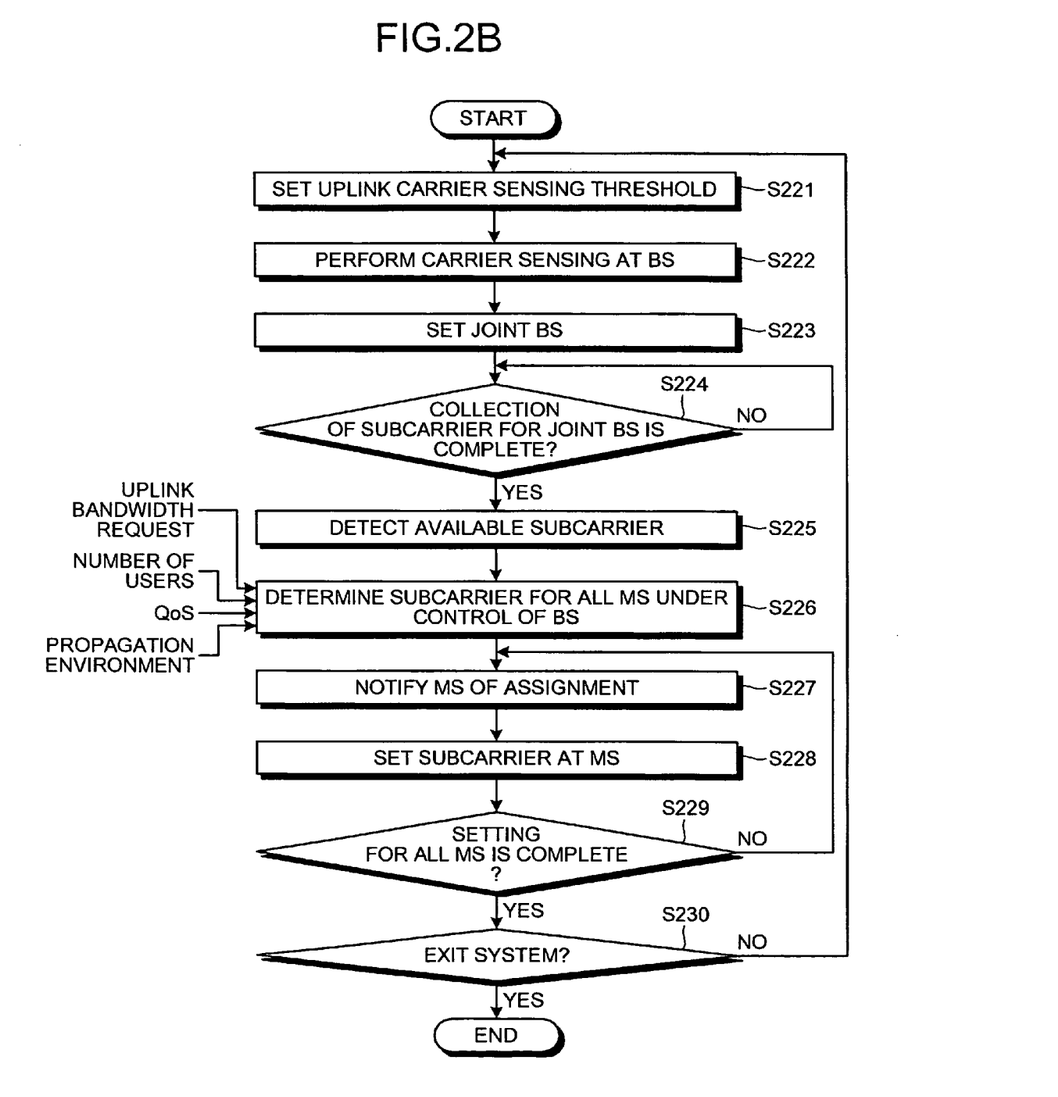
FIG. 2B is a flowchart of a process of uplink subcarrier assignment.

FIG. 2B is a flowchart of a process of uplink subcarrier assignment. For uplink communications, a base station is given in advance an uplink carrier sensing threshold (step S221). The base station performs uplink carrier sensing (step S222).

The base station makes arrangements in advance for a setting concerning information sharing among base stations adjacent to the base station (a setting for joint base stations) (step S223). The base stations set at step S223 share the result of carrier sensing. It is determined whether subcarriers (frequencies) to be used at each base station set at step S223 have been collected (step S224). Since subcarriers are different at each base station, the collection of the information concerning subcarriers (frequencies) continues until the information is gathered from all base stations (step S224: NO).

When the collection of information concerning the subcarriers (frequencies) used at each base station is complete (step S224: YES), the base station detects available subcarriers based on the results of carrier sensing shared among other base stations (step S225). The mobile station receives inputs of uplink bandwidth requests, the number of users (of mobile stations), QoS, propagation environment and so on, and determines a subcarrier (frequency) for each mobile station under the control of the base station, based on one or any combination of the inputs (step S226).

A notification of downlink subcarrier assignment is sent to each mobile station under the control of the base station based on the determination at step S226 (step S227). Each mobile station that receives the notification sets the assigned subcarrier (step S228). For example, a frequency band for an uplink subcarrier is changed based on the number of users, input obtained at step S226, and if the number of users increases, the frequency band for uplink subcarriers expands. In other words, the frequency range for one cell in FIG. 8 expands so that the reuse factor approaches 1. Further, more subcarriers for data transmission mean more data can be transmitted. A mobile station transmits data using the subcarrier assigned at step S228.

It is checked whether assignment of uplink subcarrier (frequencies) for all mobile stations is complete (step S229). If not complete (step S229: NO), the flow returns to step S227 and uplink subcarriers are assigned to remaining mobile stations. If uplink subcarriers (frequencies) are assigned to all mobile stations (step S229: YES), it is determined whether to terminate the process of uplink subcarrier assignment (whether to exit the flow) (step S230). If the process is to be continued (step S230: NO), the process from step S221 is repeated. If the process is to be terminated (step S230: YES), the above process is terminated.

Figure 3A:
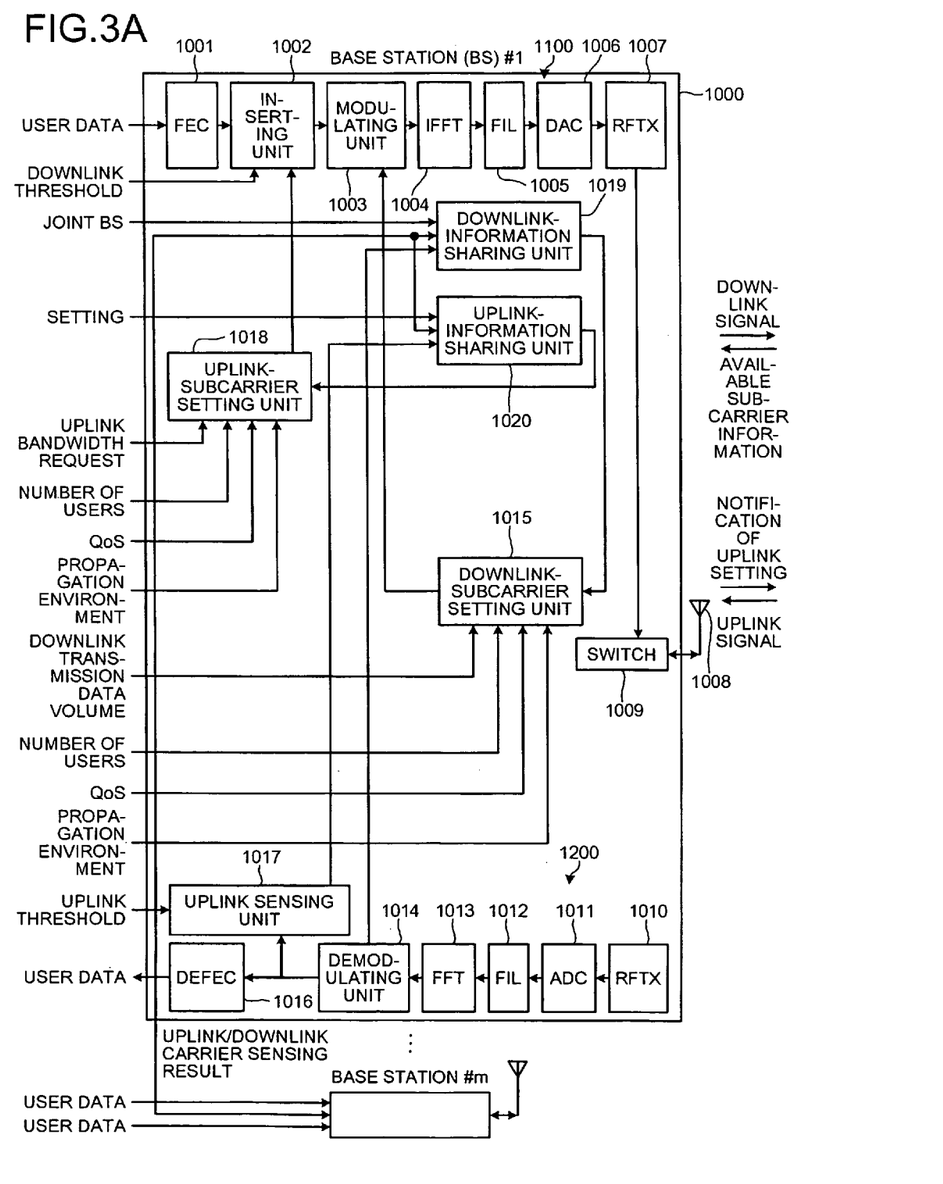
FIG. 3A is a block diagram of a base station.

FIG. 3A is a block diagram of a base station. A base station 1000 transmits user data (USERDATA) as downlink signals through a transmitting unit 1100 and outputs uplink receiving signals as user data (USERDATA) through a receiving unit 1200. FIG. 3A depicts base station #1 and another base station #m.

The transmitting unit 1100 includes a forward error corrector (FEC) 1001 that performs error correction of user data, an inserting unit 1002 that inserts information into transmitting data, a modulating unit 1003 that modulates the transmitting data, an inverse fast Fourier transform unit (IFFT) 1004 that performs inverse-Fourier transform for the modulated transmitting data, a filter unit (FIL) 1005 that filters the transmitting data, a digital-to-analog converter (DAC) 1006 that D/A-converts the transmitting data, and a radio frequency (RF) transmitting unit (RFTX) 1007 that converts the analog transmitting data into a transmitting signal in a RF band. Output from the RFTX 1007 is transmitted as downlink signals from an antenna 1008 to a mobile station through a switch 1009 used for time division duplex (TDD).

The uplink signals received at the antenna 1008 from a mobile station are input to the receiving unit 1200 through the switch 1009. The receiving unit 1200 includes an RF receiving unit (RFRX) 1010 that converts an uplink signal in an RF band into a receiving signal, an analog-to-digital converter (ADC) 1011 that A/D-converts the analog transmitting data, a filter unit (FIL) 1012, a Fourier transform unit (FFT) 1013 that performs Fourier transform for receiving data, a demodulating unit 1014 that demodulates the receiving data, and a DEFEC 1016 that decodes the receiving data and outputs the decoded data as user data (USERDATA).

The above structure describes a basic base station exclusive of the inserting unit 1002. In addition to the above structure, for the uplink, the base station further includes an uplink sensing unit 1017, an uplink-subcarrier setting unit 1018, and an uplink-information sharing unit 1020. For the downlink, the base station further includes a downlink-subcarrier setting unit 1015 and a downlink-information sharing unit 1019. The downlink-information sharing unit 1019 and the uplink-information sharing unit 1020 can be implemented by a storage unit such as a memory. The uplink-subcarrier setting unit 1018 and the downlink-subcarrier setting unit 1015 can be implemented by a control unit such as a CPU and perform processes concerning subcarrier assignment shown in FIG. 2A and FIG. 2B.

The uplink sensing unit 1017, based on an uplink threshold that is input in advance, performs uplink carrier sensing for the receiving data demodulated at the demodulating unit 1014 and stores a result of the carrier sensing in the uplink-information sharing unit 1020.

The uplink-information sharing unit 1020 stores information concerning uplink subcarriers that are below the threshold, information concerning the setting for joint base stations, and information concerning carrier sensing results received from other base stations. The information stored in the uplink-information sharing unit 1020 is shared among base stations #1-#m as shown in the figure.

The uplink-subcarrier setting unit 1018 receives information such as the uplink bandwidth request, the number of users (of mobile stations), QoS, propagation environment and so on, as well as the information stored in the uplink-information sharing unit 1020 (information concerning carrier sensing results and the setting for joint base stations). The uplink-subcarrier setting unit 1018 sets uplink subcarriers based on the information received. Information concerning the uplink subcarrier setting (uplink setting notification) is inserted into transmitting data (downlink signals) by the inserting unit 1002 and is transmitted to mobile stations.

The inserting unit 1002 receives a set downlink threshold, which is inserted into transmitting data and transmitted to mobile stations.

The downlink-information sharing unit 1019 stores the results of downlink carrier sensing fed back from mobile stations. In other words, the results of downlink carrier sensing (information concerning available subcarriers) are extracted from uplink signals by the demodulating unit 1014 of the receiving unit 1200. The demodulating unit 1014 outputs the information concerning downlink carrier sensing fed back from mobile stations to the downlink-information sharing unit 1019 and works as an obtaining unit that obtains the results of downlink carrier sensing.

The downlink-information sharing unit 1019 further stores results of downlink carrier sensing received from other base stations and the information concerning the setting of joint base stations. The information stored in the downlink-information sharing unit 1019 is shared among base stations #1-#m as shown in the figure.

The downlink-subcarrier setting unit 1015 receives information concerning the volume of downlink transmitting data, the number of uses (of mobile stations), QoS, propagation environment and so on, as well as the information stored in the downlink-information sharing unit 1019 (information concerning results of downlink carrier sensing and the setting for joint base stations). The downlink-subcarrier setting unit 1015 sets downlink subcarriers based on the information received. The information concerning the downlink subcarrier setting is inserted into transmitting data via the modulating unit 1003 and is transmitted to mobile stations.

Figure 3B:
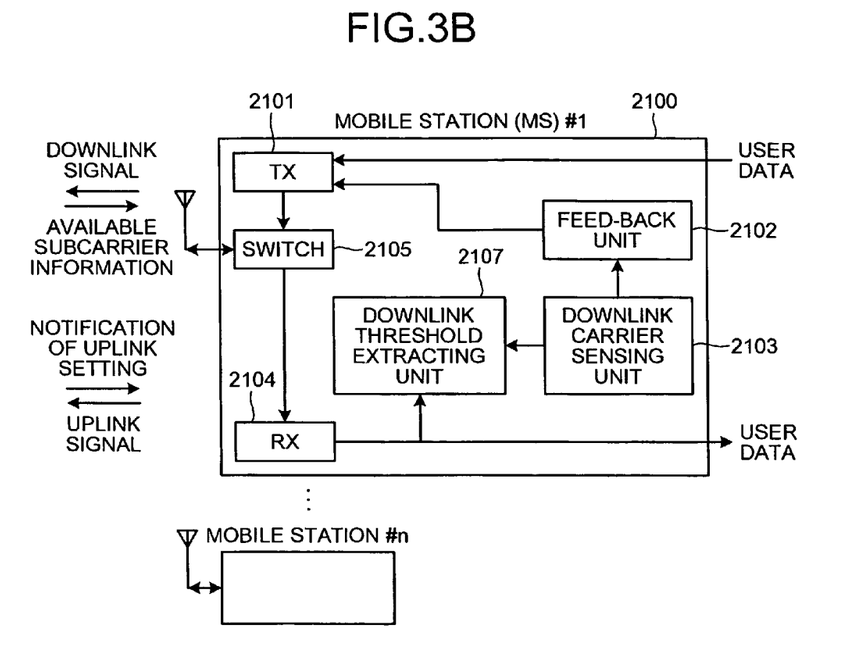
FIG. 3B is a block diagram of a mobile station.

FIG. 3B is a block diagram of a mobile station. FIG. 3B depicts a mobile station #1 and another mobile station #n.

A receiving unit (RX) 2104 receives downlink signals from the base station 1000 through an antenna 2106 and a switch 2105, and outputs the signals as user data (USERDATA). A downlink-threshold extracting unit 2107 extracts a downlink threshold included in a downlink signal from a base station and outputs the threshold to a downlink-carrier sensing unit 2103. The downlink-carrier sensing unit 2103 performs downlink carrier sensing and compares the downlink threshold with the electric field intensity at the time of the carrier sensing. A result of the comparison is output to a feed-back unit 2102 as a result of the carrier sensing.

The feed-back unit 2102 detects subcarriers less than the threshold as available subcarriers, based on the result of the carrier sensing of the downlink-carrier sensing unit 2103. Information concerning the available subcarriers is forwarded to the base station 1000 via a transmitting unit (TX) 2101. The TX 2101 functions as a notifying unit that inserts information concerning subcarriers into uplink signals directed to the base station 1000 to notify the base station 1000 of the information.

The user data (USERDATA) input to the mobile station 2100 is transmitted as uplink signals to the base station 1000 through the TX 2101, the switch 2105, and the antenna 2106.

Figure 4A:
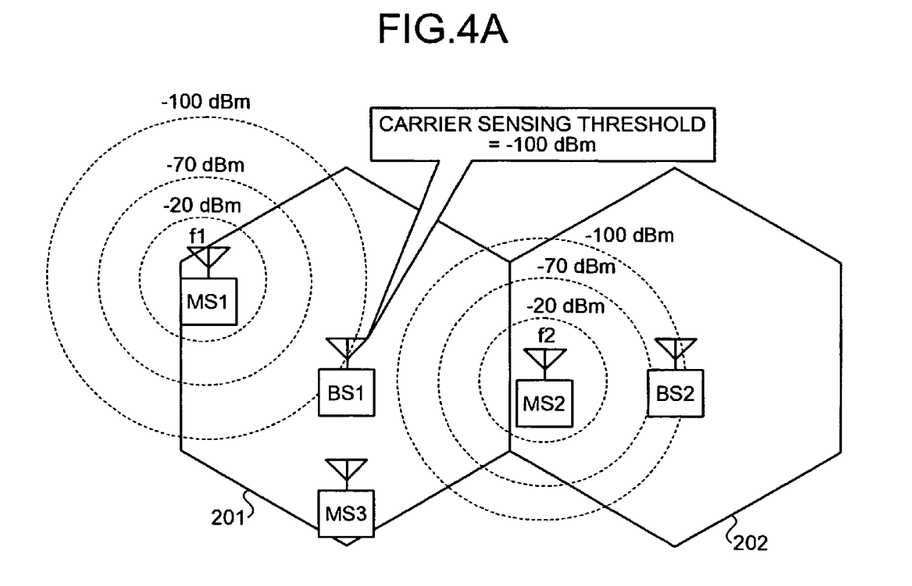
FIG. 4A is a diagram of carrier sensing in a first example of the setting of uplink subcarrier assignment.

Hereinafter, examples of the setting of subcarrier assignment with reference to the structures explained above are explained. FIG. 4A is a diagram of carrier sensing in a first example of the setting of uplink subcarrier assignment. Here, as shown in FIG. 4A, a range of carrier sensing extends to a first adjacent cell.

A base station focused on this example is called BS1. A base station in a first adjacent cell 202 adjacent to a cell 201 of BS1 is called BS2. When BS1 performs carrier sensing with a threshold equal to −100 dBm, BS1 detects a subcarrier of frequency f1 used by a mobile station MS1. When BS2 performs carrier sensing with a threshold equal to −100 dBm, BS2 detects a subcarrier of frequency f2 used by a mobile station MS2.

Figure 4B:
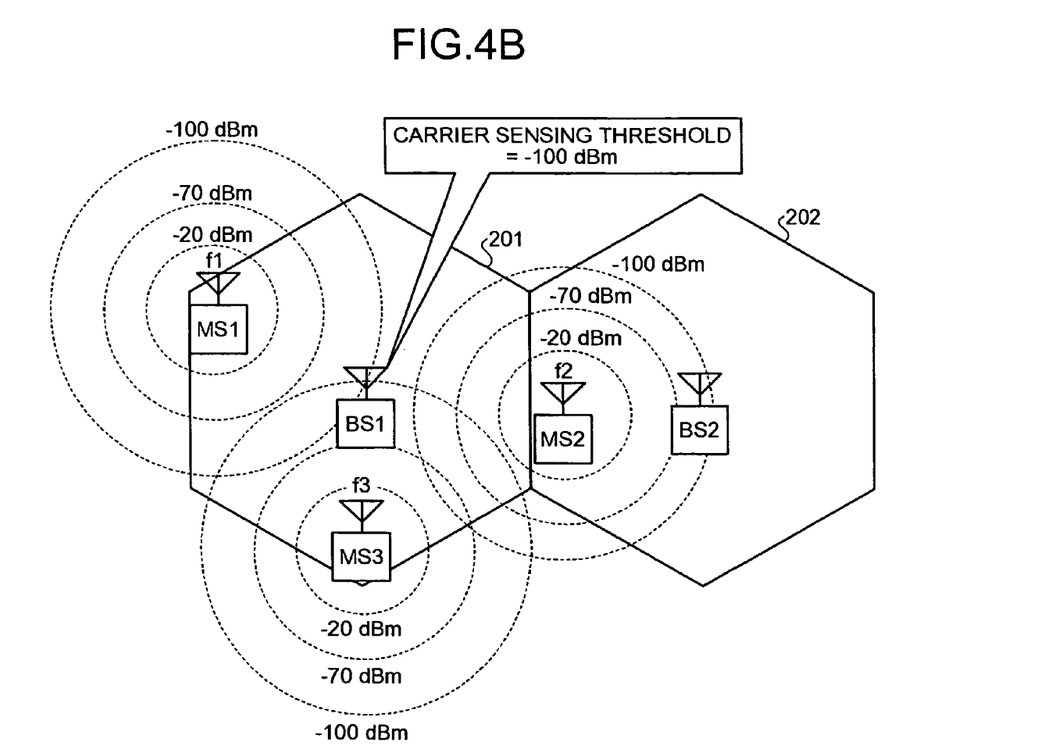
FIG. 4B is a diagram of subcarrier assignment in the first example of the setting of uplink subcarrier assignment.

FIG. 4B is a diagram of subcarrier assignment in the first example of the setting of uplink subcarrier assignment. Results of carrier sensing by BS2 are shared with BS1. Based on the results, BS1 determines that the subcarriers of frequencies f1 and f2 are being used and are not available. BS1 assigns to a new mobile station MS3 a subcarrier of frequency f3 that is different from f1 and f2. MS3 establishes communication with BS1 using a subcarrier of frequency f3. As a result, frequency interference at BS1 is reduced and uplink reception quality improves.

Figure 5A:
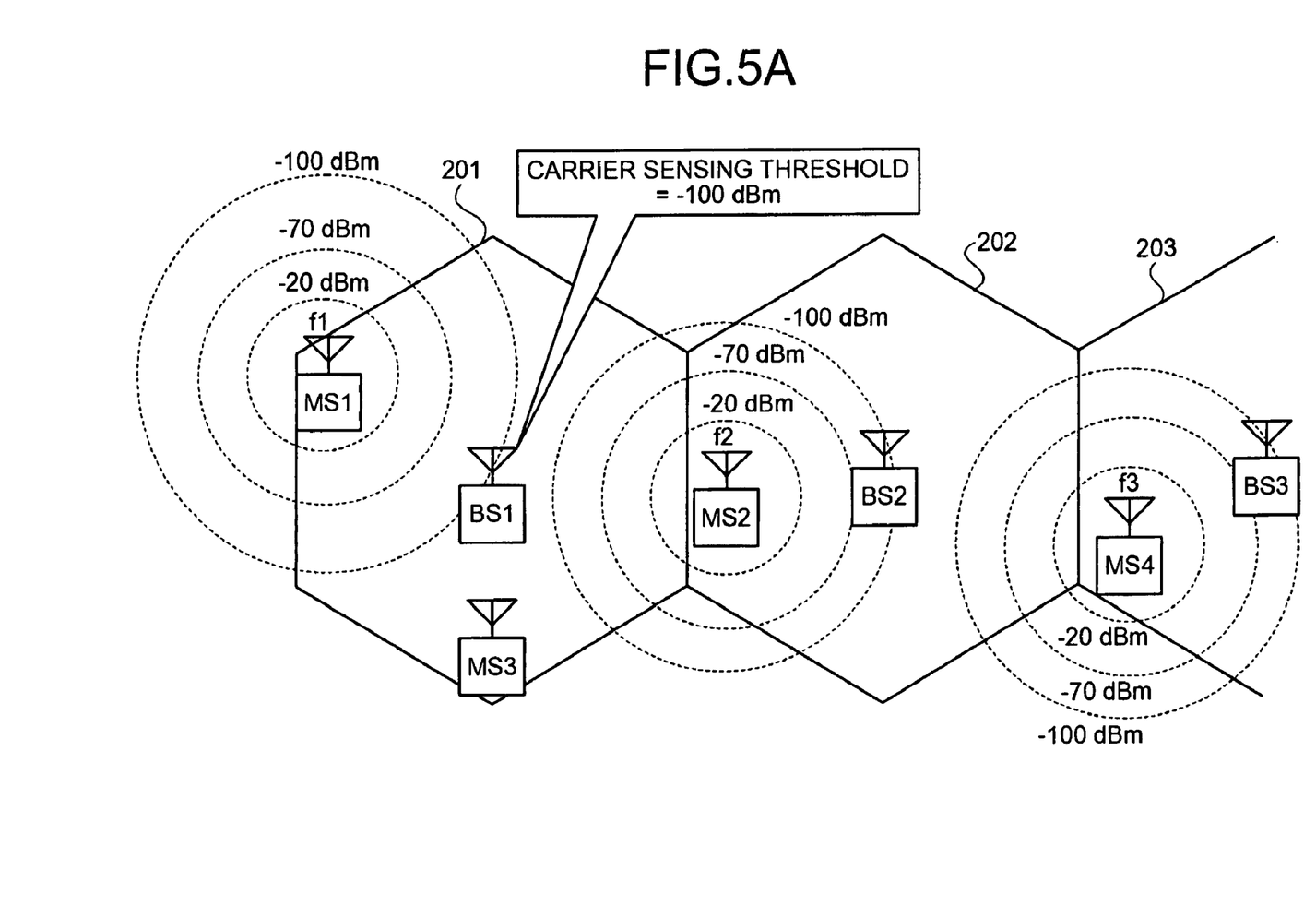
FIG. 5A is a diagram of carrier sensing in a second example of the setting of uplink subcarrier assignment.

FIG. 5A is a diagram of carrier sensing in a second example of the setting of uplink subcarrier assignment. Here, as shown in FIG. 5A, a range of carrier sensing further covers a second adjacent cell. A base station focused on in this example is called BS1. A base station in a first adjacent cell 202 immediately adjacent to a cell 201 of BS1 is called BS2. A base station in a second adjacent cell 203 is called BS3.

When BS1 performs carrier sensing with a threshold equal to −100 dBm, BS1 detects a subcarrier of frequency f1 used by a mobile station MS1. When BS2 performs carrier sensing with a threshold equal to −100 dBm, BS2 detects a subcarrier of frequency f2 used by a mobile station MS2. When BS3 performs carrier sensing with a threshold equal to −100 dBm, BS3 detects a subcarrier of frequency f3 used by a mobile station MS4.

Figure 5B:
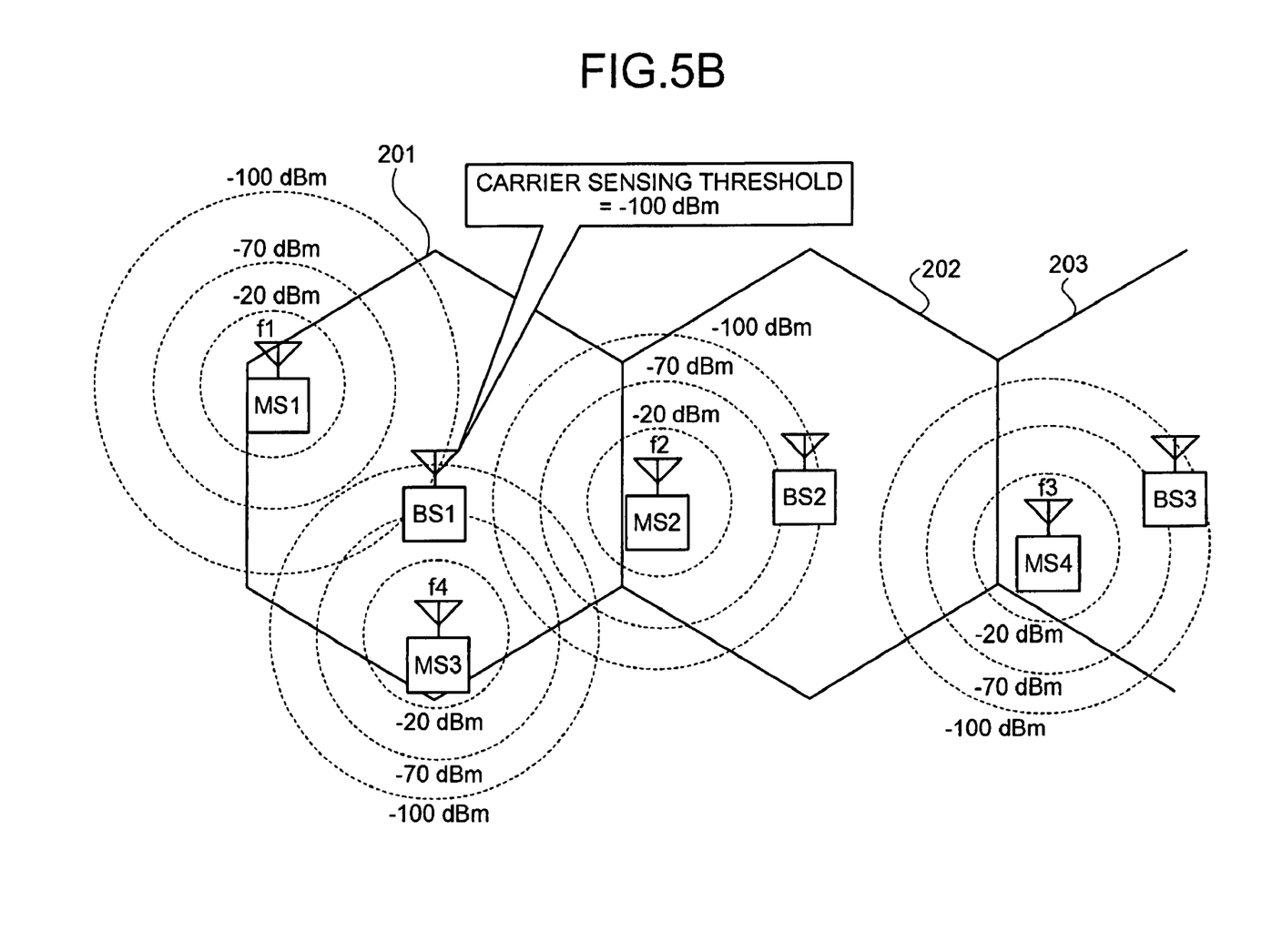
FIG. 5B is a diagram of subcarrier assignment in the second example of the setting of uplink subcarrier assignment.

FIG. 5B is a diagram of subcarrier assignment in the second example of the setting of uplink subcarrier assignment. Results of carrier sensing performed by BS2 and BS3 as shown in FIG. 5A are shared with BS1. Based on the results, BS1 determines that subcarriers of frequencies f1, f2 and f3 are being used and are not available. BS1 assigns to a new mobile station MS3 a subcarrier of frequency f4 that is different from f1, f2 and f3. As a result, frequency interference at BS1 is reduced and uplink reception quality improves.

Figure 6A:
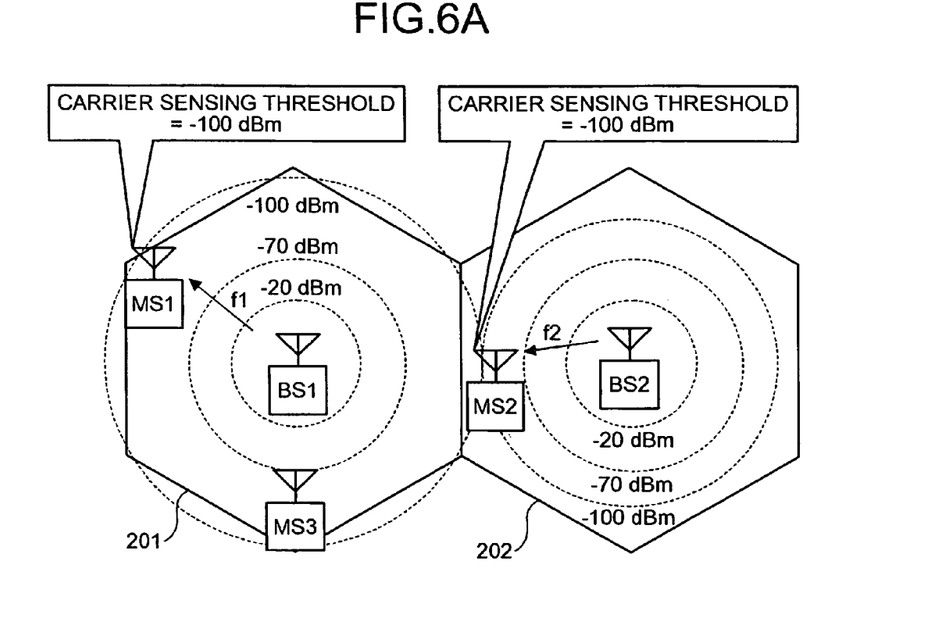
FIG. 6A is a diagram of carrier sensing in a first example of the setting of downlink subcarrier assignment.

FIG. 6A is a diagram of carrier sensing in a first example of the setting of downlink subcarrier assignment. Here, as shown in FIG. 6A, a range of carrier sensing extends to a first adjacent cell. A base station focused on this example is called BS1. A base station in a first adjacent cell 202 adjacent to a cell 201 of BS1 is called BS2. When a mobile station MS1 within a cell of BS1 performs carrier sensing with a threshold equal to −100 dBm, the mobile station MS1 detects a subcarrier of frequency f1 used by BS1 and feeds back a result of the carrier sensing to BS1. When a mobile station MS2 within a cell of BS2 performs carrier sensing with a threshold equal to −100 dBm, the mobile station MS2 detects a subcarrier of frequency f2 used by BS2 and feeds back a result of the carrier sensing to BS2.

Figure 6B:
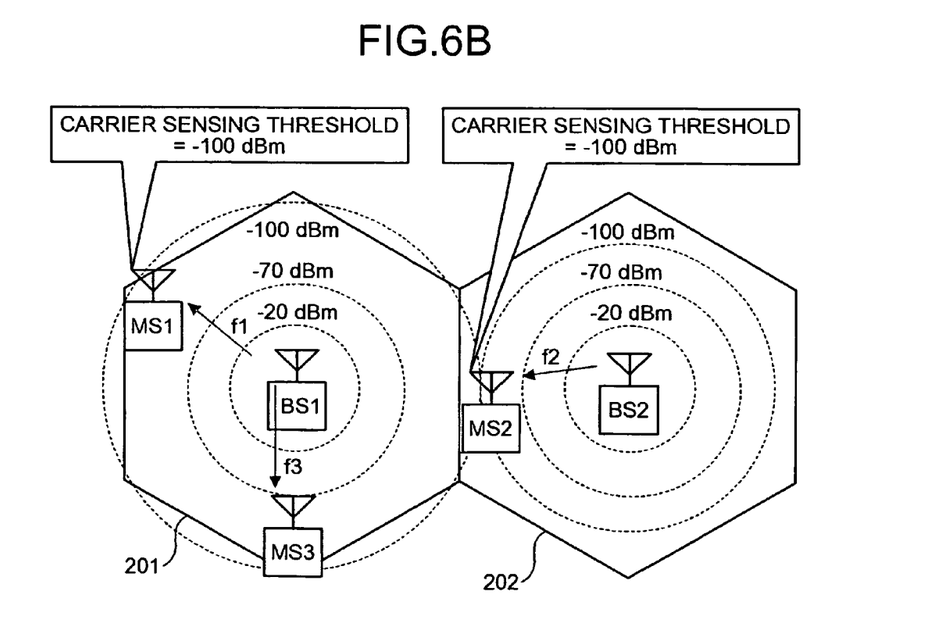
FIG. 6B is a diagram of subcarrier assignment in the first example of the setting of downlink subcarrier assignment.

FIG. 6B is a diagram of subcarrier assignment in the first example of the setting of downlink subcarrier assignment. Results of carrier sensing performed by a mobile station(s) in a cell of BS2 as shown in FIG. 6A are shared with BS1. Based on the results, BS1 determines that subcarriers of frequencies f1 and f2 are being used and are not available. BS1 assigns to a new mobile station MS3 a subcarrier of frequency f3 that is different from f1 and f2. As a result, frequency interference at each mobile station is reduced and downlink reception quality improves.

Figure 7A:
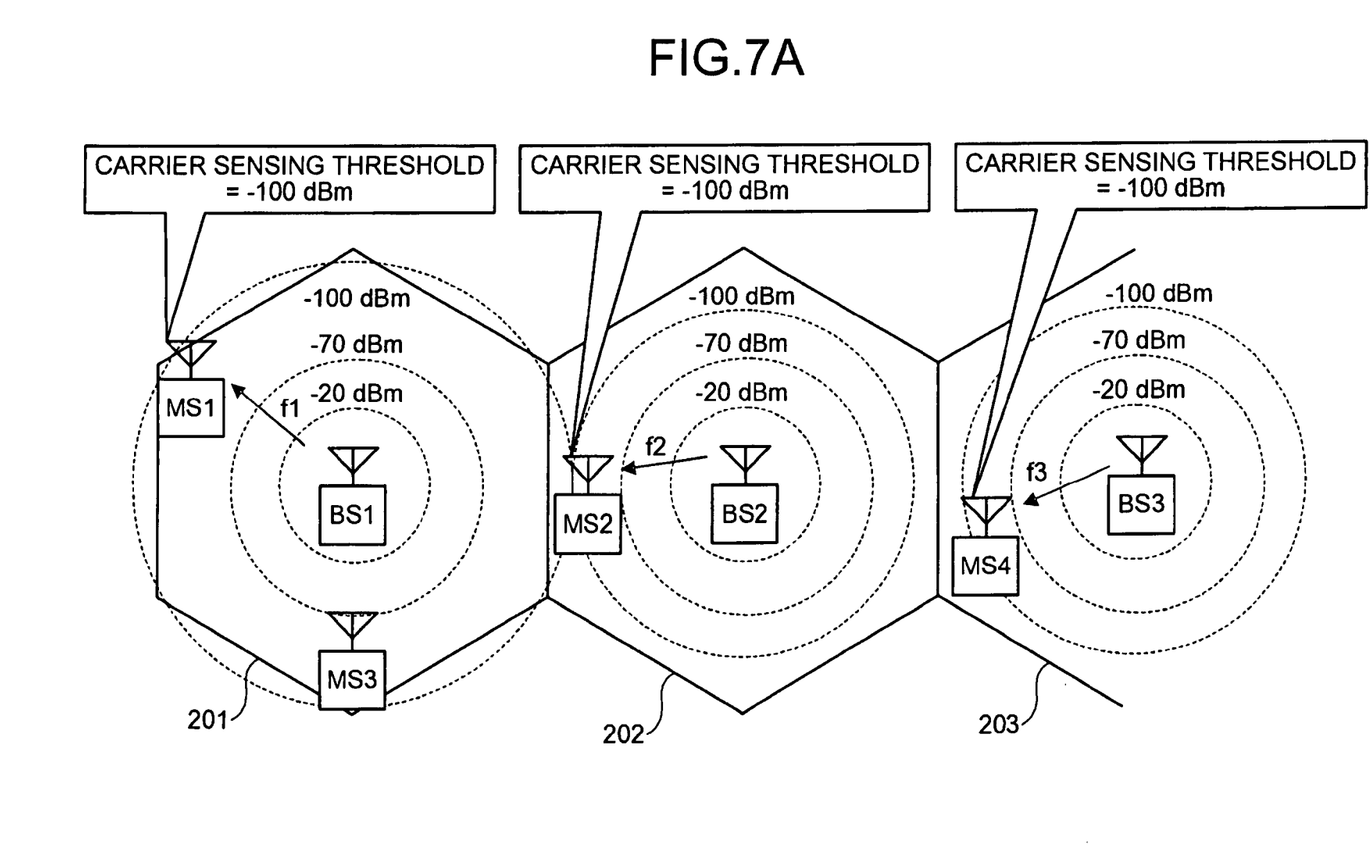
FIG. 7A is a diagram of carrier sensing in a second example of the setting of downlink subcarrier assignment.

FIG. 7A is a diagram of carrier sensing in a second example of the setting of downlink subcarrier assignment. Here, as shown in FIG. 7A, a range of carrier sensing further covers a second adjacent cell. A base station focused on this example is called BS1. A base station in a first adjacent cell 202 immediately adjacent to a cell 201 of BS1 is called BS2. A base station in a second adjacent cell 203 is called BS3.

When a mobile station MS1 within a cell of BS1 performs carrier sensing with a threshold equal to −100 dBm, MS1 detects a subcarrier of frequency f1 used by BS1 and feeds back the result of the carrier sensing to BS1. When a mobile station MS2 within a cell of BS2 performs carrier sensing with a threshold equal to −100 dBm, MS2 detects a subcarrier of frequency f2 used by BS2 and feeds back the result of the carrier sensing to BS2. When a mobile station MS4 within a cell of BS3 performs carrier sensing with a threshold equal to −100 dBm, MS3 detects a subcarrier of frequency f3 used by BS3 and feeds back the result of carrier sensing to BS3.

Figure 7B:
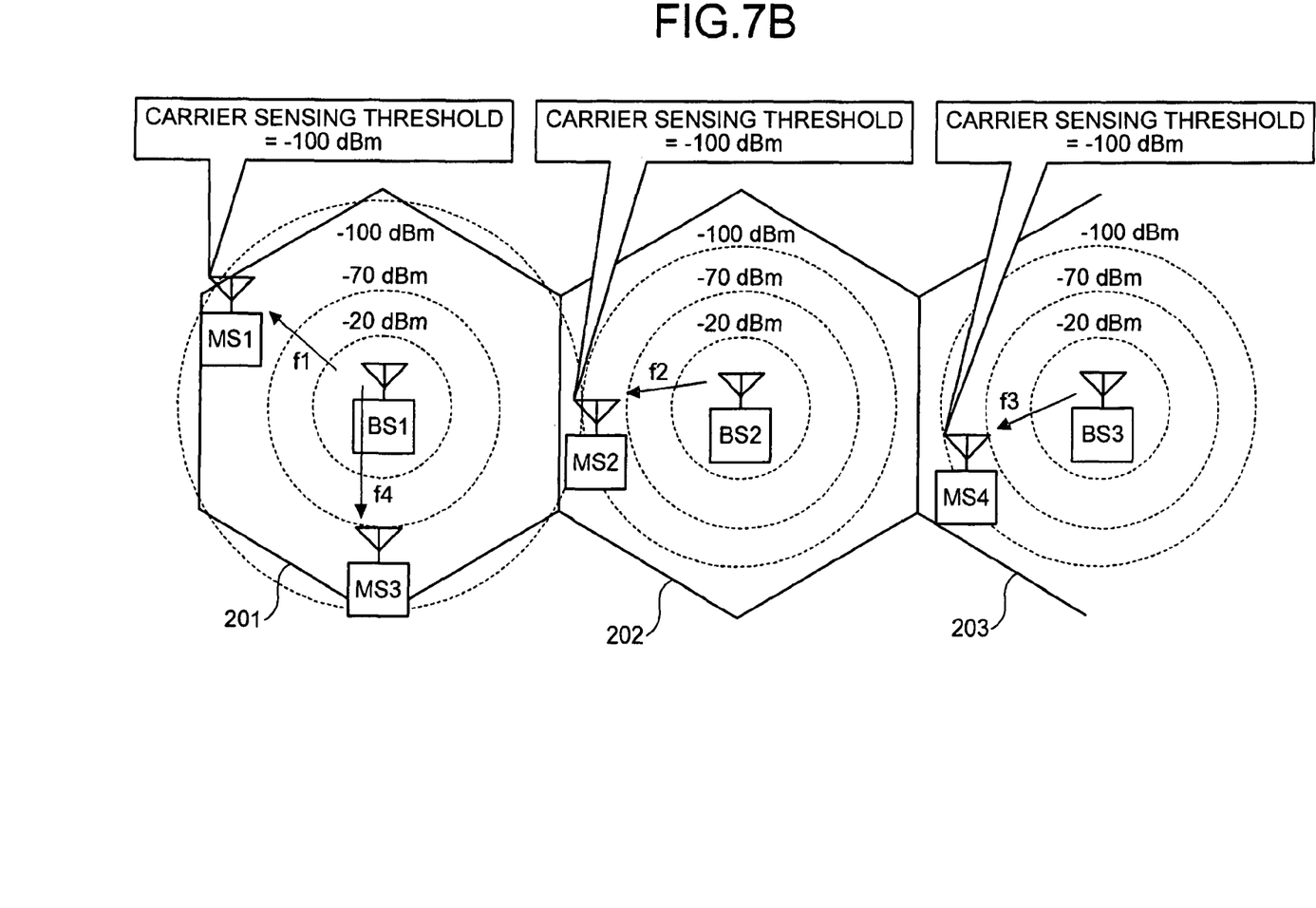
FIG. 7B is a diagram of subcarrier assignment in the second example of the setting of downlink subcarrier assignment.

FIG. 7B is a diagram of subcarrier assignment in the second example of the setting of downlink subcarrier assignment. Results of carrier sensing performed by mobile stations in cells of BS2 and BS3 as shown in FIG. 7A are shared with BS1. Based on the results, BS1 determines that subcarriers of frequencies f1, f2 and f3 are being used and are not available. BS1 assigns to a new mobile station MS3 a subcarrier of frequency f4 that is different from f1, f2 and f3. As a result, frequency interference at each mobile station is reduced and communication quality for downlink reception improves.

In the examples above, cells linearly arranged were used for convenience; however, for cells arranged vertically and horizontally with respect to each other, the assignment of subcarriers is also applicable, thereby preventing frequency interference and improving communication quality.

A threshold for carrier sensing need not be fixed but may be changed arbitrarily. In the configuration explained above, a threshold for carrier sensing set for a mobile station is given from a base station and thus a threshold can easily be set for multiple mobile stations. As explained above, the threshold may be changed according to a range of carrier sensing (area of contiguous cells), a condition of communication within a cell, the number of mobile stations and so on.

Further, as available subcarriers are detected, a frequency range of subcarriers assigned to each cell can be changed within a given frequency band. Consequently, the reuse factor can come closer to 1 after frequency interference is prevented in light of the number of users in a cell, the volume of data and so on.

As set forth above, information concerning available subcarriers that is obtained through carrier sensing at a receiving side of communication is shared among base station apparatuses. Since each base station apparatus is configured to select a subcarrier from among available subcarriers, frequency interference at the receiving side can be prevented and communication quality for reception can improve. Furthermore, since subcarriers can be assigned dynamically, the reuse factor approaches 1.

The method of assigning subcarriers explained in the present embodiment can be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A base station apparatus assigning a subcarrier in downlink communication under Orthogonal Frequency Division Multiple Access, the base station apparatus comprising:
   a receiver that receives, before downlink communication with a mobile station apparatus, information resulting from carrier sensing by the mobile station apparatus and concerning an available subcarrier of which a reception power level at the mobile station apparatus is lower than a threshold level;
   a memory that stores the received information concerning the available subcarrier which is to be informed to an adjacent base station apparatus and shared between the base station apparatus and the adjacent base station apparatus;
   a processor that sets the available subcarrier for the downlink communication before the downlink communication with the mobile station apparatus; and
   a transmitter that transmits information concerning the threshold level inserted into the signal of the downlink communication to the mobile station apparatus.

2. The base station apparatus according to claim 1, wherein the memory informs a base station apparatus in one or more adjacent cells of the information concerning the available subcarrier, the information concerning the available subcarrier being shared among the base station apparatus and a base station apparatus in one or more adjacent cells.

3. The base station apparatus according to claim 1, wherein the processor sets the available subcarrier for the downlink communication based on any one of or any combination of data volume, number of users of the mobile station apparatus, quality of service, and propagation environment.

4. The base station apparatus according to claim 1, wherein the receiver extracts the information concerning the available subcarrier from a signal of uplink communication with the mobile station apparatus.

5. A base station apparatus assigning a subcarrier in uplink communication under Orthogonal Frequency Division Multiple Access, the base station apparatus comprising:

a memory that stores information concerning an available subcarrier of which a reception power level has been detected to be lower than a threshold level by carrier sensing performed by the base station apparatus, the information concerning the available subcarrier to be informed to an adjacent base station apparatus and shared between the base station apparatus and the adjacent base station apparatus;

a processor that sets the available subcarrier for the uplink communication before the uplink communication with the mobile station apparatus; and a transmitter that transmits information concerning the threshold level inserted into the signal of the downlink communication to the mobile station apparatus.

6. The base station apparatus according to claim 5, wherein the memory informs a base station apparatus in one or more adjacent cells of the information concerning the available subcarrier, the information concerning the available subcarrier being shared among the base station apparatus and a base station apparatus in one or more adjacent cells.

7. The base station apparatus according to claim 5, further comprising a detector that performs the carrier sensing for one or more adjacent cells.

8. The base station apparatus according to claim 5, wherein the processor sets the available subcarrier for the uplink communication based on any one of or any combination of an uplink bandwidth request, number of users of the mobile station apparatus, quality of service, and propagation environment.

9. A mobile station apparatus communicating with a base station apparatus that assigns a subcarrier in uplink communication under Orthogonal Frequency Division Multiple Access, the mobile station apparatus comprising:

a transmitter that transmits information concerning an available subcarrier of which a reception power level has been detected to be lower than a threshold level by the carrier sensing performed by the mobile station apparatus, and inserted into an uplink signal to the base station apparatus to inform the base station apparatus of the information, wherein the threshold level is inserted into a downlink signal from the base station apparatus, and the available subcarrier is detected based on the threshold level.

10. A method of assigning a subcarrier under Orthogonal Frequency Division Multiple Access, the method comprising:

detecting an available subcarrier of which a reception power level is lower than a threshold level through carrier sensing by a signal-receiving apparatus that is a base station apparatus or a mobile station apparatus, before communication between the base station apparatus and the mobile station apparatus;

sharing information concerning the available subcarrier among the base station apparatus and an adjacent base station apparatus;

assigning the subcarrier to communication between the base station apparatus and the mobile station apparatus before the communication begins; and transmitting information concerning the threshold level inserted into the signal of the downlink communication to the mobile station apparatus.

11. The method according to claim 10, wherein the available subcarrier is assigned based on any one of or any combination of data volume, number of users of the mobile station apparatus, quality of service, and propagation environment.

* * * * *